US009106067B1

(12) United States Patent
Vernica

(10) Patent No.: US 9,106,067 B1
(45) Date of Patent: Aug. 11, 2015

(54) GROUND BUSHING WITH THREE WAY LAY AND LAG

(71) Applicant: Mike Vernica, Whittier, CA (US)

(72) Inventor: Mike Vernica, Whittier, CA (US)

( * ) Notice: Subject to any disclaimer, the term of this patent is extended or adjusted under 35 U.S.C. 154(b) by 68 days.

(21) Appl. No.: 14/021,647

(22) Filed: Sep. 9, 2013

(51) Int. Cl.
*H02G 3/22* (2006.01)

(52) U.S. Cl.
CPC ....................................... *H02G 3/22* (2013.01)

(58) Field of Classification Search
CPC ....... H02G 15/02; H02G 15/06; H02G 15/00; H02G 3/32; H01R 4/64; H01R 4/38; H01R 4/60; H01R 4/36; H01R 4/32; H01R 4/28; H01R 4/26; H01R 4/44
USPC ....... 174/600, 652, 152 G, 153 G, 72 A, 655, 174/51, 78, 650; 439/100, 101, 92, 777, 439/814
See application file for complete search history.

(56) References Cited

U.S. PATENT DOCUMENTS 3,066,277 A 11/1962 Edmunds
3,365,693 A * 1/1968 Browne ........................ 439/100
3,492,625 A 1/1970 Bromberg
3,967,872 A 7/1976 Mooney et al.
4,159,859 A 7/1979 Shemtov
4,189,198 A 2/1980 Reichman
4,210,374 A 7/1980 Churla
4,248,490 A * 2/1981 Bachle .......................... 439/100
4,355,852 A * 10/1982 Bachle ............................ 439/92
4,806,108 A 2/1989 Meinhardt
5,286,211 A 2/1994 McIntosh
6,494,726 B1 * 12/2002 Auclair ........................... 439/92
7,165,980 B2 1/2007 Pyron et al.
7,621,763 B2 * 11/2009 Clark et al. .................. 439/100
D618,626 S * 6/2010 Kiely ........................... D13/149
8,106,297 B1 * 1/2012 Kiely ............................ 439/100
8,231,392 B2 7/2012 Garvin

* cited by examiner

*Primary Examiner* — Angel R Estrada
(74) *Attorney, Agent, or Firm* — Kenneth L. Green; Averill & Green

(57) ABSTRACT

A ground bushing with a multi position lay and lag includes a lay and lag having several mounting surfaces for attachment of the lay and lag to the ground bushing in different positions. The bushing includes at least one mounting surface including indexing and the lay and lag includes at least two cooperating mounting surfaces to hold and position on the bushing. In one embodiment, the bushing includes one mounting surface with parallel grooves, and the lay and lag includes three cooperating mounting surfaces with cooperating parallel grooves. The lay and lag may include a smooth hole and the bushing may include a threaded hole for attaching the lay and lag to the bushing.

19 Claims, 2 Drawing Sheets

GROUND BUSHING WITH THREE WAY LAY AND LAG

BACKGROUND OF THE INVENTION

The present invention relates to electrical grounding and bonding, and more particularly to a ground fitting including a lay and lag with multiple bushing configurations.

Ground wires frequently require protection from damage. The ground wire is generally a heavy gauge wire, for example eight gauge or six gauge solid, or four gauge stranded, and is generally uninsulated. A common method for protecting a ground wire is to carry the ground wire in a metal conduit, thereby creating an armored ground wire. Such metal conduit provides the desired protection to the ground wire.

It is often necessary to connect the ground wire to a lay and lag attached to a bushing threaded onto a threaded end of the metal conduit. Unfortunately, the ground wire is often a heavy cable and difficult to sharply bend and there are several configurations of lay and lags and metal bushings to facilitate attachment of the ground wire. As a result, suppliers are required to stock the configurations and electricians often carry several configurations to a work site.

BRIEF SUMMARY OF THE INVENTION

The present invention addresses the above and other needs by providing a ground bushing with a multi position lay and lag which includes a lay and lag having several mounting surfaces for attachment of the lay and lag to the ground bushing in different positions. The bushing includes at least one mounting surface including indexing and the lay and lag includes at least two cooperating mounting surfaces to hold and position on the bushing. In one embodiment, the bushing includes one mounting surface with parallel grooves, and the lay and lag includes three cooperating mounting surfaces with cooperating parallel grooves. The lay and lag may include a smooth hole and the bushing may include a threaded hole for attaching the lay and lag to the bushing.

In accordance with one aspect of the invention, there is provided a lay and lag attachable to a bushing in three configurations, and having a lay in mouth. The lay in mouth may be positioned for a ground wire running through a metal conduit, parallel to the metal conduit, or perpendicular to the metal conduit.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
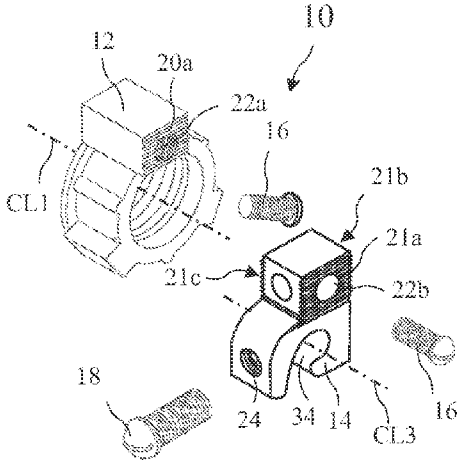
FIG. 1 shows components of a lay-in ground bushing according to the present invention.

Components of a lay-in ground bushing 10 according to the present invention are shown in FIG. 1. The lay-in ground bushing 10 includes a bushing 12 and a lay and lag 14 which may be attached in several configurations. The bushing 12 includes a first mounting surface 20*a* including indexing features and the lay and lag 14 includes three cooperating indexing surfaces 20*b*, any of which may be attached to the surface 20*a*. The indexing surfaces 20*a* and 20*b* may include a multiplicity of parallel groves, a single larger groove and valley, or raised and lowered cruciform surfaces, raised and lowered square shapes, raised and lowered oval shapes, or any cooperating shapes which resist rotation of the lay and lag 14 when attached to the bushing 12. The lay and lag 14 is configured to retain a ground wire in a clamping jaw 34 generally along a centerline CL3.

The bushing 12 includes a threaded mouth 28 (see FIGS. 2A and 2C) for connection to a metal conduit. The threaded mouth is preferably a pipe thread.

The bushing 12 preferably includes a mounting hole 22*a* for attachment of the lay and lag 14, and the mounting hole 22*a* is preferably threaded and more preferably threaded with 10-32 threads or similar threads. The mounting hole 22*a* preferably intersects the surface 20*a* and is more preferably generally centered on the surface 20*a*. A second threaded hole 26 (see FIG. 2B) is provided in the bushing 12 for a ground bushing bounding screw.

Figure 2A:
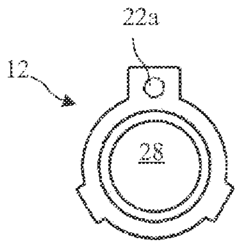
FIG. 2A shows a rear view of a bushing according to the present invention.
Figure 2B:
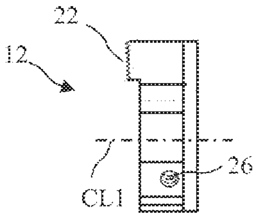
FIG. 2B shows a side view of the bushing according to the present invention.
Figure 2C:
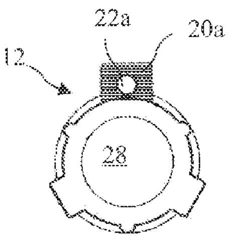
FIG. 2C shows a front view of the bushing according to the present invention.

A rear view of the bushing 12 is shown in FIG. 2A, a side view of the bushing 12 is shown in FIG. 2B, and a front view of the bushing 12 is shown in FIG. 2C. The surface 20*a* is preferably perpendicular to a centerline CL1 of the mouth 28.

Figure 3D:
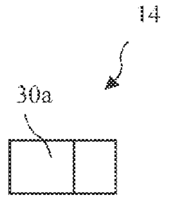
FIG. 3D shows a top view of the lay and lag according to the present invention.
Figure 3A:
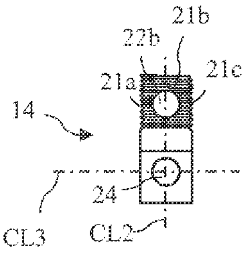
FIG. 3A shows a rear view of a lay and lag according to the present invention.
Figure 3B:
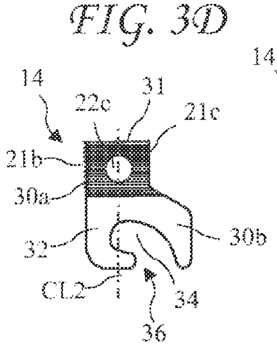
FIG. 3B shows a side view of the lay and lag according to the present invention.
Figure 3C:
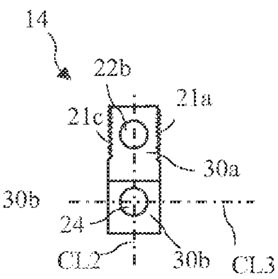
FIG. 3C shows a front view of the lay and lag according to the present invention.
Figure 3E:
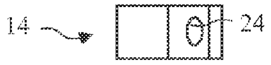
FIG. 3E shows a bottom view of the lay and lag according to the present invention.

A rear view of a lay and lag 14 is shown in FIG. 3A, a side view of the lay and lag 14 is shown in FIG. 3B, a front view of the lay and lag 14 is shown in FIG. 3C a top view of the lay and lag 14 is shown in FIG. 3D, and a bottom view of the lay and lag 14 is shown in FIG. 3E. The lay and lag 14 includes an attachment portion 30*a*, a clamping portion 30*b*, and a centerline CL2 running vertically through both the attachment portion 30*a*, and the clamping portion 30*b*. A top surface 31 of the attachment portion 30*a* may be flat or another shape, and the surfaces 21*a*, 21*b*, and 21*c* reside on three sides of the attachment portion 30*a* residing parallel with the centerline CL2. Two generally perpendicular unthreaded passages 20*b* reach through the attachment portion 30*a*, generally centered on the surfaces 20*b* and perpendicular to the centerline CL2. Any one of the three surfaces 20*b* may reside against the surface 20*a* when the lay and lag 14 is attached to the bushing 12 by the screw 16 passing through smooth holes 22*b* and 22*c* in the lay and lag 14, the smooth holes 22*b* and 22*c* preferably comprising two generally perpendicular smooth holes 22*b* and 22*c* and more preferably two intersecting smooth holes 22*b* and 22*c*. The lay and lag 14 is configured to secure a ground wire along the centerline CL3.

The clamping portion 30*b* includes an open clamping jaw 34 having a clamping jaw mouth 36, allowing a cable to lay laterally into the lay and lag 14, the cable generally perpendicular to the centerline CL2. A threaded hole 24 resides generally perpendicular to the clamping jaw 34 and to the centerline CL2. A clamping screw 18 is threadable into the threaded hole 24 and after laying a cable into the clamping jaw 34, the clamping screw 18 is tightened to hold the cable in the clamping jaw 34. The clamping screw 18 is preferably a ¼ by 20 thread screw.

Figure 4A:
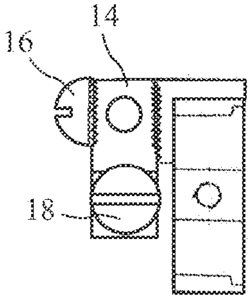
FIG. 4A shows a side view of the lay and lag attached to the bushing in a first position according to the present invention.
Figure 4B:
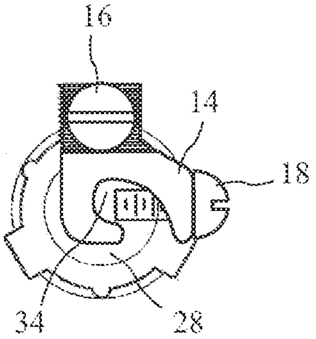
FIG. 4B shows a front view of the lay and lag attached to the bushing in the first position according to the present invention.

A side view of the lay and lag 14 attached to the bushing 12 in a first position is shown in FIG. 4A and a front view of the lay and lag 12 attached to the bushing 14 in the first position is shown in FIG. 4B. The clamping jaw 34 is generally aligned with the mouth 28 of the bushing 12, allowing easy clamping of a cable carried in metal conduit.

Figure 5A:
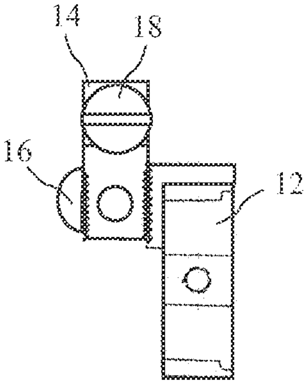
FIG. 5A shows a side view of the lay and lag attached to the bushing in a second position according to the present invention.
Figure 5B:
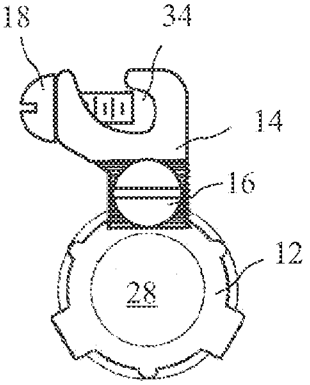
FIG. 5B shows a front view of the lay and lag attached to the bushing in the second position according to the present invention.

A side view of the lay and lag 14 attached to the bushing 12 in a second position is shown in FIG. 5A and a front view of the lay and lag 12 attached to the bushing 14 in the third position is shown in FIG. 5B. The clamping jaw 34 is offset and generally parallel with the mouth 28 of the bushing 12, allowing easy clamping of a cable running parallel to the metal conduit.

Figure 6A:
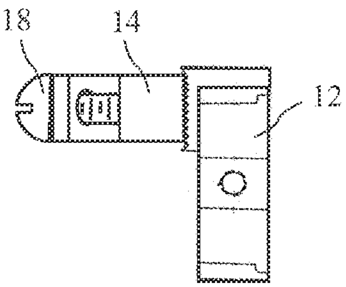
FIG. 6A shows a side view of the lay and lag attached to the bushing in a third position according to the present invention.
Figure 6B:
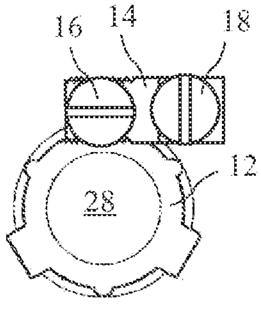
FIG. 6B shows a front view of the lay and lag attached to the bushing in the third position according to the present invention.

A side view of the lay and lag 14 attached to the bushing 12 in a third position is shown in FIG. 6A and a front view of the lay and lag 12 attached to the bushing 14 in the third position is shown in FIG. 6B. The clamping jaw 34 is generally perpendicular with the mouth 28 of the bushing 12, allowing easy clamping of a cable running perpendicular to the metal conduit.

While the invention herein disclosed has been described by means of specific embodiments and applications thereof, numerous modifications and variations could be made thereto by those skilled in the art without departing from the scope of the invention set forth in the claims.

I claim:

1. A ground bushing with a multi position lay and lag comprising: a bushing having a threaded mouth and a bushing mounting surface; a lay and lag attachable to the bushing and comprising: at least two cooperating mounting surfaces configured to reside against the bushing mounting surface when the lay and lag are attached to the bushing, the cooperating mounting surfaces generally perpendicular to each other and providing at least two configurations of the lay-in ground bushing; wherein the bushing mounting surface and the cooperating mounting surfaces include indexing features to restrain the lay and lag from rotation when attached to the bushing; a clamping jaw open to receive a cable laterally inserted therein; and a clamping screw threadably engaging the lay and lag and intersecting the clamping jaw to bear against the cable residing in the clamping jaw.

2. The ground bushing with a multi position lay and lag of claim 1, wherein the indexing features are parallel grooves.

3. The ground bushing with a multi position lay and lag of claim 1, wherein the lay and lag are attached to the bushing by a screw.

4. The ground bushing with a multi position lay and lag of claim 1, wherein:

the lay and lag include an attachment portion and a clamping portion; and the cooperating surfaces comprise three cooperating surfaces on the attachment portion.

5. The ground bushing with a multi position lay and lag of claim 4, wherein:

the lay and lag define a vertical centerline CL2 reaching through the attachment portion and the clamping portion;

the attachment portion extends along the centerline CL2 from the clamping portion opposite to the clamping jaw and the attaching portion has a generally rectangular cross-section generally perpendicular to the centerline CL2; and the three cooperating surfaces reside on three sides of the attachment portion parallel with the centerline CL2.

6. The ground bushing with a multi position lay and lag of claim 5, wherein the clamping portion is configured to retain a ground wire generally perpendicular to the centerline CL2.

7. The ground bushing with a multi position lay and lag of claim 5, wherein the three cooperating surfaces are on a right side, a left side, and a rear side between the right side and the left side of the attaching portion.

8. The ground bushing with a multi position lay and lag of claim 7, wherein the attaching portion resides opposite to a clamping jaw mouth of the clamping jaw.

9. The ground bushing with a multi position lay and lag of claim 7, wherein the attaching portion includes two holes therethrough, a first hole generally perpendicular to the right and left sides and a second hole generally perpendicular to the rear side and both holes generally perpendicular to the centerline CL2.

10. The ground bushing with a multi position lay and lag of claim 1, wherein the bushing mounting surface is generally perpendicular to a bushing centerline CL1.

11. The ground bushing with a multi position lay and lag of claim 1, wherein the bushing includes exactly one bushing mounting surface.

12. A ground bushing with a three position lay and lag comprising:

a bushing having a threaded mouth and a bushing mounting surface having indexing features comprising parallel grooves and a threaded hole through the bushing mounting surface;

a lay and lag attachable to the bushing by a screw and comprising:

Three cooperating mounting surfaces configured to reside against the bushing mounting surface when the lay and lag are attached to the bushing and having cooperating indexing features comprising cooperating parallel grooves to resist movement of the lay and lag, the cooperating mounting surfaces providing three configurations of the lay-in ground bushing;

two generally perpendicular smooth holes through the lay and lag, the smooth holes generally centered on the cooperating mounting surfaces;

a clamping jaw open to receive a cable laterally inserted therein; and a clamping screw threadably engaging the lay and lag and intersecting the clamping jaw to bear against the cable residing in the clamping jaw; and a bushing screw residing through one of the smooth holes and threadedly engaging the threaded hole in the bushing and securing the lay and lag to the bushing.

13. The ground bushing with a multi position lay and lag of claim 12, wherein the bushing mounting surface is generally perpendicular to a bushing centerline CL1.

14. The ground bushing with a multi position lay and lag of claim 12, wherein:

the lay and lag defines a vertical centerline CL2 reaching through the attachment portion and the clamping portion;

the attachment portion extends along the centerline CL2 from the clamping portion opposite to the clamping jaw and the attaching portion has a generally rectangular cross-section generally perpendicular to the centerline CL2; and the three cooperating surfaces reside on three sides of the attachment portion parallel with the centerline CL2.

15. The ground bushing with a multi position lay and lag of claim 14, wherein:

the three cooperating surfaces are on a right side, a left side, and a rear side between the right side and the left side of the attaching portion;

the attaching portion resides opposite to a clamping jaw mouth of the clamping jaw; and the attaching portion includes two holes therethrough, a first hole generally perpendicular to the right and left sides and a second hole generally perpendicular to the rear side and both holes generally perpendicular to the centerline CL2.

16. The ground bushing with a multi position lay and lag of claim 12, wherein:

the attachment portion extends along the centerline CL2 from the clamping portion opposite to the clamping jaw and the attaching portion has a generally rectangular cross-section generally perpendicular to the centerline CL2; and the three cooperating surfaces reside on three sides of the attachment portion parallel with the centerline CL2.

17. The ground bushing with a multi position lay and lag of claim 16, wherein:

the three cooperating surfaces are on a right side, a left side, and a rear side between the right side and the left side of the attaching portion;

the attaching portion resides opposite to a clamping jaw mouth of the clamping jaw; and the attaching portion includes two holes therethrough, a first hole generally perpendicular to the right and left sides and a second hole generally perpendicular to the rear side and both holes generally perpendicular to the centerline CL2.

18. A ground bushing with a three position lay and lag comprising:

a bushing having a threaded mouth and a bushing mounting surface having indexing features comprising parallel grooves;

a lay and lag attachable to the bushing mounting surface by a screw and comprising:

a clamping portion including:

a clamping jaw open to receive a cable laterally inserted therein; and a clamping screw threadably engaging the lay and lag and intersecting the clamping jaw to bear against the cable residing in the clamping jaw;

a generally rectangular attachment portion comprising:

three cooperating mounting surfaces, each configured to independently reside against the bushing mounting surface when the lay and lag are attached to the bushing and providing three configurations of the lay-in ground bushing;

cooperating indexing features on the mounting surfaces, the cooperating indexing features comprising cooperating parallel grooves resisting movement of the lay and lag attached to the bushing; and a vertical centerline CL2 reaching through the attachment portion and the clamping portion; and the three cooperating surfaces reside on three sides of the attachment portion and parallel with the centerline CL2.

19. The ground bushing with a multi position lay and lag of claim 18, wherein the bushing mounting surface is generally perpendicular to a bushing centerline CL1.

* * * * *